United States Patent [19]

Harada et al.

[11] Patent Number: 5,366,816

[45] Date of Patent: Nov. 22, 1994

[54] POTASSIUM HEXATITANATE WHISKERS HAVING A TUNNEL STRUCTURE

[75] Inventors: Hidefumi Harada; Yasuo Inoue; Eiji Sadanaga, all of Yamaguchi, Japan

[73] Assignee: Titan Kogyo Kabushiki Kaisha, Ube, Japan

[21] Appl. No.: 901,232

[22] Filed: Jun. 19, 1992

[30] Foreign Application Priority Data

Jun. 20, 1991 [JP] Japan ................................ 3-148836
Feb. 6, 1992 [JP] Japan ................................ 4-021281

[51] Int. Cl.$^5$ .......................... C22C 1/09; C01G 23/00
[52] U.S. Cl. ................................. 428/614; 423/598; 501/95; 501/134
[58] Field of Search ................. 423/598; 428/614; 501/134, 95; C22C 1/09

[56] References Cited

U.S. PATENT DOCUMENTS 4,810,439  3/1989  Fujiki et al. ..................... 423/598
5,084,422  1/1992  Harada et al. .................... 501/95

FOREIGN PATENT DOCUMENTS 241198   10/1987  European Pat. Off. .
0323012  7/1989   European Pat. Off. .
64-73031 3/1989   Japan .
2-74527  3/1990   Japan ........................... 423/598

OTHER PUBLICATIONS

Suganuma et al, "AA6061 composite ... whisker", J. of Mat. Science Letter 8 (1989) 808–810.
Shimizu et al, Synthesis of Potassium Titanate Fibers by Melt Reaction Between . . . , 1977, no month.
Linsen et al, New Inorganic Fibers For Plastic Reinforcement, 27th Annual Technical Conference, 1972 Reinforced Plastics/ Composites Institute The Society of the Plastics Industry, Inc., section 11-D, pp. 1–10 no month.

*Primary Examiner*—Gary P. Straub
*Assistant Examiner*—N. M. Nguyen
*Attorney, Agent, or Firm*—Cushman, Darby & Cushman

[57] ABSTRACT

A potassium hexatitanate whisker having a tunnel structure containing aluminum and niobium impurities in such amounts that $Al_2O_3/Nb_2O_5$ molar ratio is 0.6 or higher and composite materials using the same. Also disclosed are processes for producing composite materials using the potassium hexatitanate whiskers having a tunnel structure with a light alloy or a thermoplastic resin.

2 Claims, 1 Drawing Sheet

POTASSIUM HEXATITANATE WHISKERS HAVING A TUNNEL STRUCTURE

BACKGROUND OF THE INVENTION

Industrial Field of the Invention

The present invention relates to a novel type of whiskers and a fiber reinforced composite material using the same. More particularly, the present invention relates to potassium hexatitanate whiskers having a tunnel structure and containing aluminum and niobium, both of which are impurities, in such amounts that the $Al_2O_3/Nb_2O_5$ molar ratio is at least 0.6. The present invention also relates to a composite material comprising said whiskers as a reinforce material and a thermoplastic resin or a light alloy as a matrix.

Whiskers such as silicon carbide whiskers, silicon nitride whiskers, aluminum borate whiskers, and potassium titanate whiskers are known heretofore. However, only potassium titanate whiskers among them are put to practical use as a reinforcing material for general use plastics as well as for engineering plastics. This is ascribed to the fact that whiskers other than potassium titanate whiskers are too expensive. The least expensive potassium titanate whiskers, however, are still expensive as compared with glass fibers and wollastonite which are widely used as reinforcing materials for plastics. The application of the composite materials containing potassium titanate whiskers at present is therefore confined to an extremely narrow field. Accordingly, from the viewpoint of extending the use of the known composite materials and of acquiring the role of a reinforcing material for plastics, it is desirable for production cost of potassium titanate whiskers to be substantially lowered to a price comparable to that of glass fibers, or to develop potassium titanate whiskers having a higher strength without increasing production costs.

With respect to the aim of providing low price potassium titanate whisker reinforced plastics, some developments thereon have been made as described, for example, in Japanese Patent Public Disclosure (Kokai) Nos. 60-51615 and 60-191019. However, there has been made no attempt to provide advanced composite materials having a higher mechanical strength at a low price, by taking advantage of whiskers having an improved strength.

Furthermore, potassium titanate whiskers are now attracting attention as a reinforcing material for light alloys to provide a general use industrial material. This tendency is ascribed to the fact that the reinforcing materials suited for reinforcing alloys, i.e., the ceramic fibers, are quite expensive as compared with potassium titanate whiskers. Hence, the use of a relatively cheap potassium titanate whiskers would provide a low-price composite material having a wide range of application. With respect to the production process, squeeze-casting method is most favorable from the viewpoint of the performance of the resulting composite material and of production costs. This process is advantageous in that the reaction can be accomplished in a short period of time and carried out with relatively simple manufacturing apparatus. Thus, reinforced composite materials which suffer less problems concerning reaction of the reinforcing material and the light alloy matrix can be obtained by a relatively simple process.

It was reported that potassium titanate whiskers react vigorously with an molten aluminum (see Hideharu Fukunaga, Michifumi Takeichi, and Nobuhiro Ohta, J. Jpn. Soc. Compos. mater, 8(1982), p.66), but this problem was overcome by an improved potassium titanate whisker disclosed in Japanese Patent Public Disclosure (Kokai) No. 1-301516, as potassium hexatitanate whiskers having a tunnel structure and a free potassium content of 5 ppm or less.

The potassium titanate whiskers above were obtained by considerably reducing the content of layered structure potassium titanate included in the potassium hexatitanate whiskers having a tunnel structure. The development of such potassium titanate whiskers has enable their use as a reinforcing material for light alloys with a view to providing general use industrial materials (see K. Suganuma, T. Fujita, K. Niihara, T. Okamoto, and S. Suzuki, J. Mater. Sci. Letters, 8 (1989) p.808).

The metal-based reinforced material using the above potassium titanate whiskers as the reinforcing material exhibited improved mechanical strength as compared with the light alloy matrix composite using the conventional potassium titanate whiskers, however, it still was subjected to the disadvantages inherent to the composite using the conventional potassium titanate whiskers. For example, when a heat treatment was applied to the composite material with an aim to improving, for example, mechanical strength, resistance against stress corrosion cracking, and the like, the potassium titanate whiskers decreased strength and/or exhibited no improvement In the intended properties. Further, Suganuma et al. found magnesium-based very narrow reaction layer below 10 nm, was formed on the surface of potassium titanate whiskers during a production of a composition of potassium titanate whiskers and an aluminum alloy. They pointed out that the strength of the matrix is thereby reduced, because magnesium content in the matrix alloy is reduced. However, they also reported that this reaction layer remained unchanged through the heat treatment process after producing the composite, and hence it was still unclear why the strength of the potassium titanate whisker reinforced light alloy should be reduced by the heat treatment.

As described above, the conventional potassium titanate whisker reinforced metal composites were not favorable for use in an industrial material due to their lack of stability during a heat treatment, and hence the development of a novel and economically advantageous composite material capable of increasing its strength by a heat treatment, i.e., a composite material having thermal stability, was not accomplished.

An object of the present invention is to provide more economically a composite material having improved mechanical strength as compared with conventional types, by improving the mechanical strength of potassium titanate whiskers.

SUMMARY OF THE INVENTION

In the light of the circumstances described above, the present inventors have conducted an extensive study to overcome the problems. As a result, it has been found effective to use, as a reinforcing material, potassium hexatitanate whiskers having a tunnel structure and containing aluminum and niobium, both of which being impurities, in such amounts that the $Al_2O_3/Nb_2O_5$ molar ratio is at least 0.6. The present invention has been accomplished based on these findings.

More specifically, the present invention has been accomplished based on the following findings: that conventional potassium titanate whiskers inevitably include impurities such as niobium, phosphorus, aluminum, silicon, iron, and alkaline earth metals, whose origin can be found in the starting materials, and that such impurities cause a reduction in strength of the composite materials during heat treatment; and further, that such a loss of strength during the heat treatment of a composite material containing impurities can be avoided by controlling the amount of niobium and aluminum in potassium titanate whiskers as such to give the $Al_2O_3/Nb_2O_5$ molar ratio 0.6 or higher. The conventional potassium titanate fibers as a reinforcement are synthesized from starting materials that have high contents of impurities such as niobium, aluminum, phosphorus, calcium, magnesium, iron and silica, as exemplified by titanium oxide in anatase form produced by the sulfate process, metatitanic acid, and naturally occurring rutile sand or anatase sand. Potassium titanate fibers synthesized from these starting materials contain large amounts of impurities. Thus, the resulting potassium titanate whiskers obtained therefrom inevitably contain a considerable amount of impurities, and hence a high strength cannot be achieved in such products. Furthermore, aluminum alloys reinforced with such potassium titanate whiskers having a high impurity content suffer a large reduction in strength during the heat treatment thereof. However, it has been also found that potassium titanate whiskers containing niobium and aluminum at a controlled $Al_2O_3/Nb_2O_5$ molar ratio of 0.6 or higher yield an increased strength, and that plastics having been reinforced with the same can also exhibit high strength. Furthermore, it has been found that such whiskers, when used as a reinforcing material of an aluminum alloy, avoid a reduction in strength of the composite materials containing a large amount of impurities during the heat treatment thereof. The present invention has been accomplished based on the basis of the findings stated above.

The present invention provides a composite material comprising a thermoplastic resin matrix or a light alloy matrix, reinforced with potassium hexatitanate whiskers having a tunnel structure and containing aluminum and niobium impurities in such amounts that the $Al_2O_3/Nb_2O_5$ molar ratio is at least 0.6.

DETAILED DESCRIPTION OF THE INVENTION

Figure 1:
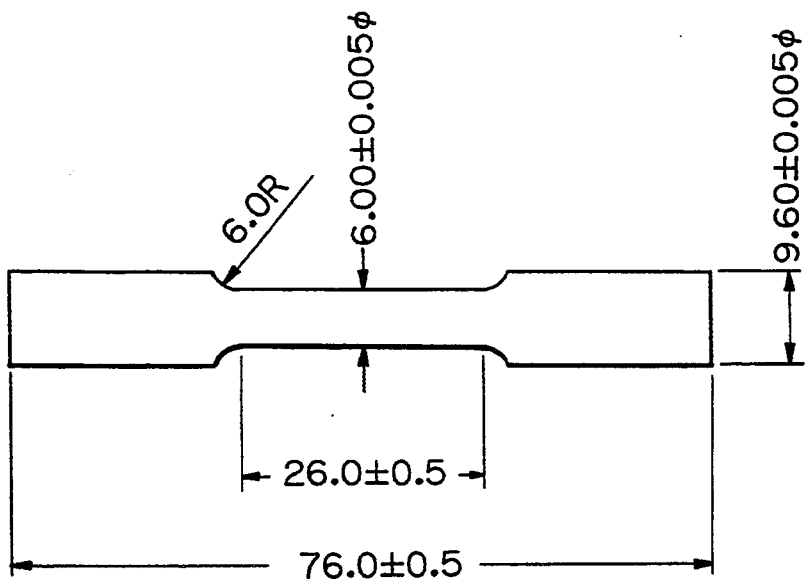
FIG. 1 shows schematically, the shape of a test piece to be subjected to a tensile test.

The potassium titanate whiskers according to the present invention have a tunnel structure and containing aluminum and niobium, both of which are impurities in such amounts that the $Al_2O_3/Nb_2O_5$ molar ratio is at least 0.6. Most preferably, they are potassium hexatitanate whiskers having a tunnel structure and containing aluminum and niobium, both of which are impurities in such amounts that the $Al_2O_3/Nb_2O_5$ molar ratio is at least 0.6, with the total content of impurities other than aluminum and niobium being controlled to 1% or less in terms of oxides, and furthermore, they are single crystal whiskers free from other phases such as layered structure potassium titanate and titanium dioxide in the inside or on the surface of said whiskers. If layered structure potassium titanate or titanium dioxide were to be incorporated in the whiskers, the whiskers themselves become reduced in strength as compared with the comparative single crystal whiskers. Moreover, because such layered structure potassium titanate and titanium dioxide have extremely high reactivity with light alloys as compared with potassium hexatitanate whiskers having a tunnel structure, the whiskers would suffer considerable damage at making the composite with the light alloy matrix or at the subsequent heat treatment process. Thus, such potassium titanate whiskers are unsatisfactory.

The potassium titanate whiskers according to the present invention can be produced representatively by the following process:

First, a titanium feed compound and a potassium feed compound are blended in such proportions as to provide a composition represented by the general formula $K_2O \cdot nTiO_2$ (n=2−4); the resulting mixture is baked at 900°−1100° C. to yield masses of potassium titanate whiskers; the masses of potassium titanate whiskers are dipped in cold or warm water so that they are disintegrated into individual single whiskers; thereafter, an acid is added to the slurry of individual single whiskers and its pit is adjusted to between 9.3 and 9.7, whereby the composition of potassium titanate whiskers is transformed to a $TiO_2/K_2O$ molar ratio of 5.9–6.0; subsequently, the whiskers are heated at 900°−1150° C. For at least 1 h; finally, the whiskers are washed with an acid.

Examples of the titanium feed compound that can be used to produce the potassium titanate whiskers include hydrated titanium oxides, titanium dioxide in anatase form, titanium dioxide in rutile form, and rutile ores. The potassium feed compound slay be selected from among those compounds which generate $K_2O$ during sintering, as exemplified by $K_2O$, KOH, $K_2CO_3$ and $KNO_3$. While niobium impurity in the starting material is almost wholly included in the crystal lattice of the potassium titanate whiskers to form a solid solution therewith, aluminum is only partially incorporated in the crystal lattice to make solid solution, because a part of the incorporated aluminum forms a compound with potassium. Accordingly, aluminum and niobium contents in the starting material must be controlled in such amounts that the $Al_2O_3/Nb_2O_5$ molar ratio is at least 0.7. The aluminum which does not constitute the crystal structure of the potassium titanate whisker and reacts with a potassium has no effect on improving the properties of the whisker, furthermore the reacted aluminum compound reacts with potassium titanate whiskers and damages them during the conversion step of the whiskers from layered structure to the tunnel structure. Thus, it is preferred that such aluminum is separated and removed. This can be done in the step of immersing the synthesized masses of the potassium titanate whiskers into cold or warm water to obtain the individual single whiskers. Because the reacted compound of aluminum and potassium dissolves in water. That is, the slurry is subjected to a solid-liquid separation before adding thereto an acid. However, if the content of aluminum having undergone reaction with potassium is about 0.2% or less as calculated for an oxide by weight of potassium titanate whiskers, the separation and removal process can be omitted without causing any particular problem. If the starting material were to contain too many impurities which form water-soluble compounds with potassium, the masses are preferably immersed in cold or warm water, and the slurry is then subjected to solid-liquid separation before adding thereto an acid to exclude the water-soluble compounds. Potassium titanate whiskers with improved properties are obtained in this way.

If a starting material containing niobium and aluminum in such amount that $Al_2O_3/Nb_2O_5$ molar ratio is less than 0.7 was to be used, an aluminum compound is added therein to control the $Al_2O_3/Nb_2O_5$ ratio to fall in the range of from 0.7 to 1.2. There can be expected no further improvement in the properties of the resulting potassium titanate whiskers even if aluminum is added to give the $Al_2O_3/Nb_2O_5$ molar ratio is higher than 1.2. Moreover, the addition of aluminum in excess results in too much formation of potassium aluminate which makes it difficult to separate the mass whisker into individual single whiskers. The aluminum compounds to be added include aluminum sulfate, aluminum chloride, aluminum nitrate, aluminum hydroxide, aluminum oxide, and aluminates.

The total amount for niobium and aluminum is not particularly limited, provided that the molar ratio thereof fall in the range defined above. However, it can be seen that the total amount for both depends on the niobium having incorporated in the starting material. In general, the starting material contain about 0.6% niobium as calculated for $Nb_2O_5$ at maximum, and in such a case, the total content For niobium and aluminum would be about 0.9% as calculated for an oxide.

The potassium titanate preferably contains as few impurities other than niobium and aluminum as possible. However, potassium titanate whiskers having an impurity content of 1% or less as calculated for an oxide pose no particular problem. If impurities are incorporated in the potassium titanate whiskers at a concentration exceeding 1%, mechanical strength is reduced even if aluminum and niobium were to be incorporated at a such amount that $Al_2O_3/Nb_2O_5$ molar ratio is 0.7 or higher. The reinforcing effect of such potassium titanate whiskers for a composite material is also reduced. Furthermore, in such a case, the strength of a heat-treated composite material comprising a light alloy and potassium titanate whiskers is considerably reduced and hence the reinforcing effect by whiskers is also reduced. Such an unfavorable result is particularly pronounced when an element other than quadrivalent ones, or when an element having an ionic radius differing from that of $Ti^{4+}$ ion by 10% or more is dissolved in the crystal structure of potassium titanate whiskers, or when a quadrivalent element having weaker affinity with oxygen than titanium is dissolved in the crystal structure of potassium titanate whiskers. It is believed that such elements enumerated above accelerate the reduction of potassium titanate whiskers at the production of a composite of the whiskers with light alloys or at the heat treatment subsequent thereto, thereby lowering the strength of the whiskers. As a result, a poor reinforcing effect results.

The potassium titanate whiskers to be used in the present invention preferably have an average length of 5 μm or more and an average aspect ratio (average length/average diameter) of 10 or more.

The light alloys to be used in the present invention include aluminum based light alloys, such as Al—Mg based alloys, Al—Mn based alloys, Al—Si based alloys, Al—Mg—Si based alloys, Al—Cu based alloys, Al—Cu—Si based alloys, and Al—Cu—Mg—Ni based alloys. That is, any aluminum alloy used in general can be used without any particular restriction, and magnesium alloys can also be used.

A composite of the potassium hexatitanate whiskers and a light alloy can be produced by any of the known processes, such as a powder alloylurgical method and a squeeze casting method.

If composite materials are to be produced by a squeeze casting method, a fiber preform must be formed preliminarily. If this is the case, a sintered fiber preform is preferably used in place of a fiber preform that is prepared with an inorganic binder being added, and the reason is as follows: if a fiber preform is prepared using an inorganic binder, the latter will react with the potassium titanate fibers to reduce their strength and reinforcing effect inherent in the fibers cannot be effectively imparted to light alloys; Furthermore, the high reactivity of the inorganic binder with alloy components will lead to uneven presence of the alloy components or they will interfere with the formation of interalloylic compounds that affect the intended improvement in the strength of the matrix, whereby the desired effectiveness of heat treatment cannot be easily attained.

A sintered preform can be prepared in the following manner: an organic binder is added to a reinforcing material containing potassium titanate; after blending, the mixture is baked at a temperature of 800°–1100° C., whereupon the potassium titanate fibers are sintered to an adequate extent, thereby yielding a melt casting preform having satisfactory characteristics.

The potassium hexatitanate fibers and a light alloy are used in such proportions that the volume fraction of the potassium hexatitanate fibers is in the range of 5–40%. If the volume fraction of the potassium hexatitanate fibers is less than 5%, their effectiveness in reinforcing the matrix alloy is very small. If, on the other hand, the volume fraction of the potassium hexatitanate fibers is more than 40%, lesser improvement is achieved in strength as the volume fraction of the potassium hexatitanate fibers increases. In addition, an increasing use of the potassium hexatitanate fibers results in a higher cost of composite materials.

In the process of producing the alloy-based composite material according to the present invention, additional reinforcing materials, such as short alumina fibers, short crystalline alumina silica fibers, silicon carbide whiskers, silicon nitride whiskers, aluminum borate whiskers, long alumina fibers, carbon fibers, silicon carbide fibers, and tyranno fibers may be used as well. The combined use of these additional whiskers with the potassium hexatitanate whiskers of the present invention can further provide favorable effects to the potassium hexatitanate whisker reinforced alloy matrix composite material of the present invention, such as an improvement in strength and wear resistance, or a lowering of thermal expansion coefficient.

The thermoplastic resin for use in the present invention include general use plastics such as polypropylene, ABS, and vinyl chloride resins; engineering plastics such as polyamide, polyacetal, polyethylene terephthalate, polybutylene terephthalate, polyphenylene sulfide, polycarbonate, and liquid crystal polymers; and alloys thereof. The thermoplastic resins used in common can be freely used as desired.

The plastics and the potassium hexatitanate whiskers are mixed at such a ratio that the potassium hexatitanate whiskers are incorporated at a weight fraction of from 3 to 50%. If the potassium hexatitanate whiskers is insufficiently added as to account for less than 3% by weight, the reinforcing effect to be imparted to the plastics becomes too little, whereas an addition thereof in excess as to exceed 50% by weight not only impairs the moldability of the mixture but also leads to the formation of a costly composite material.

In the production of the composite material according to the present invention, it is preferred to use potassium titanate whiskers which is treated with a surface-treating agent such as a silane coupling agent. The potassium titanate whiskers can be incorporated into the composite material by either using potassium titanate whiskers having been surface-treated in advance, or adding the surface treating agent at the kneading step of potassium titanate whiskers with plastics. It is preferred, to use potassium titanate whiskers which have previously been subjected to surface treatment because the effect of the surface-treating agent can be more fully exhibited.

The silane coupling agent suitable for use in the present invention include, for example, amino-type silane coupling agents such as γ-aminopropyl triethoxysilane and N-(β-aminoethyl)-γ-aminopropyl trimethoxysilane; epoxy-type silane coupling agents such as γ-glycidoxypropyl trimethoxysilane and β-(3,4-epoxycyclohexyl-)ethyl trimethoxysilane; vinyl-type silane coupling agents such as vinyltrimethoxysilane, vinyltriethoxysilane, and vinyl-tris(2-methoxyethoxy)silane; mercapto-type silane coupling agents such as γ-mercaptopropyl trimethoxysilane; and acrylic silane coupling agents such as γ-methacryloxypropyl trimethoxysilane. An amount of those silane coupling agents is preferably 2.0% by weight or less with respect to the potassium titanate whiskers. An addition in excess does not provide further improvement.

The composite material according to the present invention may contain depending on the purpose, one or more of various types of additives such as fire retardants, thermal stabilizers, and lubricants, in a range that their addition does not impair the properties inherent in the composite material. Otherwise, other fillers may be added with an aim to Impart the desired properties to the composite. Because the potassium titanate whiskers according to the present invention exhibit considerably improved mechanical strength as compared with the conventional whiskers, a lower quantity can be added to plastics to obtain a comparative effects. Furthermore, a composite having a mechanical strength far higher than any using conventional potassium titanate whiskers can also be realized.

The present invention is described in further detail below referring to some Examples. However, it should not be construed to be limiting the scope of the invention. In the following examples, all percentages and parts are by weight unless otherwise stated.

EXAMPLE 1

A slurry of 4700 g of a metatitanic acid comprising 30% of $TiO_2$, 0.129% of $Nb_2O_5$, and 0.017% of $Al_2O_3$ was added 18 ml of an aqueous aluminum sulfate solution containing 50 g/l of aluminum as $Al_2O_3$, and the resulting mixture was stirred for 20 minutes. After adding thereto 730 g of potassium carbonate powder and mixing, the slurry was spray-dried while maintaining the temperature at the inlet to a range of from 270° to 280° C. and that at the outlet from 80° to 85° C. The powder thus obtained was charged into an alumina crucible, and was placed in an electric furnace for baking. The baking was conducted by heating the powder at a rate of 200° C./hour, maintaining at 940° C. for 1 hour, and cooling at a rate of 150° C./hour.

The resulting baked product was then dipped into 12 l of hot water maintained in a stainless steel vessel, and after 5 hours of immersion, the slurry was stirred at 4000 rpm for 1 hour using a T. K. Homomixer (a high-shear type mixer manufactured by Tokushu kika Kogyo Co., Ltd.). The temperature of the slurry was then adjusted to 60° C., and 5N-hydrochloric acid was added therein dropwise to adjust the pH value to 9.4. As further stirring increases the pH value due to the elution of potassium ions from between the layers of the potassium tetratitanate, hydrochloric acid was continually added dropwise every 30 minutes after the first addition thereof, so that the :increment in pH value might not exceed 0.1. In this manner the slurry was adjusted to the pH to 9.4. A polymeric flocculant (trade name: Hymolock MP-173H, a product of HYMO Corporation) was added into the resulting slurry at an amount of 0.2% by weight to the potassium titanate whiskers, to thereby effect flocculation of the whiskers.

The whiskers thus obtained was filtered, washed, and baked at 1000° C. for 1 hour. The resulting product was dispersed into 10 l of hot water, and stirred for 30 minutes using T. K. Homomixer to obtain the fibers dispersed in the water. After adjusting the pH value of the dispersion to 4 by adding dropwise 1N-hydrochloric acid, whiskers were obtained by filtration, washing, and drying. Identification of the resulting fibers by X-ray diffraction revealed that the final product were single phase of potassium hexatitanate. SEM (Scanning Electron Microscope) observation revealed the whiskers to average length of 14 μm and an average diameter of 0.4 μm. The specific surface area as measured by BET method was 4.4 $m^2$/g.

Chemical analysis of the potassium titanate whiskers thus obtained yielded 0.356% $Nb_2O_5$, 0.093% $Al_2O_3$, 0.006% $Fe_2O_3$, 0.008% MgO, 0.085% CaO, 0.012% ZnO, 0.008% $P_2O_5$, and 0.006% $SiO_2$ as impurities, and the molar ratio of $TiO_2/K_2O$ was found to be 6.0.

The value of $d_{712}$-spacing was found to be 1.6645 Å by powder X-ray diffraction using 99.9% pure high purity silicon powder as the internal standard.

Then 20 parts of the potassium titanate whiskers obtained above, which was surface-treated with 0.7% γ-aminopropyl trimethoxysilane, was charged together with 80 parts of a Nylon 66 resin (trade name: UBE Nylon 2020B, a product of Ube Industries, Ltd.) into a twin-screw extruder AS-30 (manufactured by Nakatani Kikai Co., Ltd.), to obtain pellets thereof by melting and kneading at 280° C.

Comparative Example 1

A slurry of 4700 g of a metatitanic acid comprising 30% of $TiO_2$, 0.129% of $Nb_2O_5$, and 0.017% of $Al_2O_3$ was added 730 g of potassium carbonate powder, and the resulting mixture was mixed. The slurry thus obtained was spray-dried while maintaining the temperature at the inlet to a range of from 270° to 280° C. and that at the outlet from 80° to 85° C. The powder thus obtained was charged into an alumina crucible, and was placed in an electric furnace for baking. The baking was conducted by heating at a rate of 200° C./hour, maintaining at 940° C. for 1 hour, and cooling at a rate of 150° C./hour.

The resulting baked product was then dipped into 12 l of hot water maintained in a stainless steel vessel, and after 5 hours of immersion, the slurry was stirred at 4000 rpm for 1 hour using a T. K. Homomixer. The temperature of the slurry was then adjusted to 60° C., and 5N- hydrochloric acid was added therein dropwise to adjust the pH value to 9.4. Because a further stirring increases the pH value due to the elution of potassium ions from between the layers of the potassium tetratitanate, hydrochloric acid was continually added dropwise every 30 minutes after the first addition thereof, so that the increment in pH might not exceed 0.1. In this manner the slurry was adjusted to the pH value to 9.4. A polymeric flocculant (trade name: Hymolock MP-17, a product of HYMO Corporation) was added into the resulting slurry at an amount of 0.2% by weight to the potassium titanate whiskers, to thereby effect flocculation of the whiskers.

The whiskers thus obtained was filtered and baked at 1000° C. for 1 hour. The resulting product was dispersed into 10 l of hot water, and stirred for 30 minutes using T. K. Homomixer to obtain the fibers dispersed in the water. After adjusting the pH value of the dispersion to 4 by adding dropwise 1N hydrochloric acid, potassium titanate whiskers were obtained by filtration, washing, and drying. SEM (Scanning Electron Microscope) observation revealed the whiskers to an average length of 15 μm and an average diameter 0.4 μm. The specific surface area as measured by BET method was 4.5 m²/g.

Chemical analysis of the potassium titanate whiskers thus obtained yielded 0.355% $Nb_2O_5$, 0.040% $Al_2O_3$, 0.006% $Fe_2O_3$, 0.009% MgO, 0.083% CaO, 0.012% ZnO, 0.009% $P_2O_5$, and 0.006% $SiO_2$ as impurities, and the molar ratio of $TiO_2/K_2O$ was found to be 6.0.

The value of $d_{712}$-spacing was found to be 1.6657 Å by powder X-ray diffraction using 99.9% pure high purity silicon powder as the internal standard. The value 1.6657 Å is larger than that obtained for potassium titanate in Example 1, and it is believed that this increase in d-spacing is caused by dissolving of $Al^{3+}$ in a crystal lattice of potassium titanate, i.e., because $Al^{3+}$ ion is smaller than $Ti^{3+}$ in ion diameter and substituted for $Ti^{3+}$ in the crystal lattice of potassium titanate. Then 20 parts of the potassium titanate whiskers obtained above, which have been surface-treated with 0.7% γ-aminopropyl trimethoxysilane, was charged together with 80 parts oF a Nylon 66 resin (trade name: UBE Nylon 2020B, a product of Ube Industries, Ltd.) into a twin-screw extruder AS-30 (manufactured by Nakatani Kikai Co., Ltd.), to obtain pellets thereof by melting and kneading at 280° C.

The pellets thus obtained in Example 1 and Comparative Example 1 were dried in a vacuum drier at 120° C. for 12 hours, and were then injection molded using an injection molding machine Model SAV-30-30 (manufactured by Yamashiro Seiki Seisakusho) at a cylinder temperature of from 260° to 280° C. and a mold surface temperature of 80° C. Thus were obtained test specimens for use in testing tensile strength and flexural strength. In Table 1 are given the strength measured on dried test pieces.

TABLE 1

|  | Example 1 | Comp. Example 1 |
| --- | --- | --- |
| Tensile Strength (kgf/cm2) | 1210 | 1020 |
| Flexural Strength (kgf/cm2) | 2190 | 1750 |
| Flexural modulus (kgf/cm2) | 94000 | 80500 |

Potassium titanate whiskers were extracted from the test pieces to measure the lengths. The potassium titanate whiskers from the test piece of Example 1 were found to have an average length of 7.3 μm, and those from the one of Comparative Example 1 were found to be 7.5 μm on average; hence no significant difference was observed in the length of the whiskers.

EXAMPLE 2

Potassium titanate whiskers were synthesized following the process as described in Example 1, except that the baking temperature after partially removing potassium from between layers of the potassium tetratitanate whiskers was changed from 1000° C. to 950° C. The purity and the chemical composition of the resulting potassium titanate whiskers were the same as those of the whiskers obtained in Example 1.

Then 20 parts of the potassium titanate whiskers obtained above, which was further surface-treated with 0.6% γ-glycidoxypropyl trimethoxysilane, was charged together with 80 parts of a polyacetal resin (trade name: Duracon M90, a product of Polyplastics Co., Ltd.) into a twin-screw extruder AS-30 (manufactured by Nakatani Kikai Co., Ltd.), to obtain pellets thereof by melting and kneading at 220° C.

Comparative Example 2

Potassium hexatitanate whiskers having a tunnel-structure were synthesized under conditions similar to those used in the process of Comparative Example 1, except for using titanium oxide in anatase form (containing 0.157% $Nb_2O_5$ and 0.032% $Al_2O_3$) as the titanium source. SEM observation of the whiskers thus obtained revealed that they have an average length of 15 μm and an average diameter of 0.4 μm. Chemical analysis of the potassium titanate whiskers yielded 0.131% $Nb_2O_5$, 0.026% $Al_2O_3$, 0.012% $Fe_2O_3$, 0.014% MgO, 0.094% CaO, 0.014% ZnO, 0.010% $P_2O_5$, and 0.013% $SiO_2$ as impurities, and the molar ratio of $TiO_2/K_2O$ was found to be 6.0.

Then 20 parts of the potassium titanate whiskers obtained above, which was further surface-treated with 0.6% γ-glycidoxypropyl trimethoxysilane, was charged together with 80 parts of a polyacetal resin (trade name: Duracon M90, a product of Polyplastics Co., Ltd.) into a twin-screw extruder AS-30 (manufactured by Nakatani Kikai Co., Ltd.), to obtain pellets thereof by melting and kneading at 220° C.

The pellets thus obtained in Example 2 and Comparative Example 2 were dried in a vacuum drier at 110° C. for 10 hours, and were then injection molded using an injection molding machine Model SAV-30-30 (manufactured by Yamashiro Seiki Seisakusho) at a cylinder temperature of 210° C. and a mold surface temperature of 80° C. Thus were obtained test specimens for use in tests for tensile strength and flexural strength. In Table 2 are given the results obtained in the strength tests. Potassium titanate whiskers were extracted from the test pieces to measure their lengths, however, no significant difference was observed between the whiskers of Example 2 and of Comparative Example 2.

TABLE 2

|  | Example 2 | Comp. Example 2 |
| --- | --- | --- |
| Tensile Strength (kgf/cm2) | 1210 | 960 |
| Flexural Strength (kgf/cm2) | 2020 | 1630 |
| Flexural modulus (kgf/cm2) | 102000 | 78500 |

EXAMPLE 3

Potassium hexatitanate whiskers having a tunnel-structure were synthesized under conditions similar to those of the process in Example 1, except for using titanium oxide in anatase form (containing 0.157% $Nb_2O_5$ and 0.072% $Al_2O_3$) as the titanium source. SEM observation of the whiskers thus obtained revealed that they have an average length of 15 μm and an average diameter of 0.4 μm. Chemical analysis of the potassium titanate whiskers yielded 0.130% $Nb_2O_5$, 0.055% $Al_2O_3$, 0.008% $Fe_2O_3$, 0.009% MgO, 0.101% CaO, 0.010% ZnO, 0.010% $P_2O_5$, and 0.007% $SiO_2$ as impurities, and the molar ratio of $TiO_2/K_2O$ was found to be 6.0.

Then 15 parts of the potassium titanate whiskers obtained above, which was further surface-treated with 0.6% γ-glycidoxypropyl trimethoxysilane, was charged together with 85 parts of a polycarbonate resin (trade name: Iupilon S-2000, a product of Mitsubishi Gas Chemical Company Inc.) into a twin-screw extruder AS-30 (manufactured by Nakatani Kikai Co., Ltd.), to obtain pellets thereof by melting and kneading at 280° C.

Comparative Example 3

15 parts of the potassium titanate whiskers used in Comparative Example 2 (a product having surface-treated with 0.6% γ-glycidoxypropyl trimethoxysilane) was charged together with 85 parts of a polycarbonate resin (trade name: Iupilon S-2000, a product of Mitsubishi Gas Chemical Company Inc.) into a twin-screw extruder AS-30 (manufactured by Nakatani Kikai Co., Ltd,), to obtain pellets thereof by melting and kneading at 280° C.

The pellets obtained in Example 3 and Comparative Example 3 were then injection molded using an injection molding machine Model SAV-30-30 (manufactured by Yamashiro Seiki Seisakusho) at a cylinder temperature of 290° C. and a mold face temperature of 90° C. Thus were obtained test specimens for use in tests for tensile strength and flexural strength. In Table 3 are given the results obtained in the strength tests. Potassium titanate whiskers were extracted from the test pieces to measure their lengths, however, no significant difference was observed between the whiskers of Example 3 and of Comparative Example 3.

TABLE 3

|  | Example 3 | Comp. Example 3 |
| --- | --- | --- |
| Tensile Strength (kgf/cm2) | 920 | 750 |
| Flexural Strength (kgf/cm2) | 1630 | 1310 |
| Flexural modulus (kgf/cm2) | 82500 | 67000 |

EXAMPLE 4

20 parts of the potassium hexatitanate whiskers obtained in Example 1 having surface-treated with 0.5% γ-glycidoxypropyltrimethoxysilane was charged together with 80 parts of a poly butyleneterephthalate resin (trade name: Duranex 2000, a product of Polyplastics Co., Ltd.) into a twin-screw extruder AS-30 (manufactured by Nakatani Kikai Co., Ltd.), to obtain pellets thereof by melting and kneading at 250° C.

Comparative Example 4

20 parts of the potassium hexatitanate whiskers obtained in Comparative Example 1 having surface-treated with 0.5% γ-glycidoxypropyltrimethoxysilane was charged together with 80 parts of a poly butyleneterephthalate resin (trade name: Duranex 2000, a product of Polyplastics Co., Ltd.) into a twin-screw extruder AS-30 (manufactured by Nakatani Kikai Co., Ltd.), to obtain pellets thereof by melting and kneading at 250° C.

The pellets obtained in Example 4 and Comparative Example 4 were then injection molded using an injection molding machine Model SAV-30-30 (manufactured by Yamashiro Seiki Seisakusho) at a cylinder temperature of 250° C. and a mold face temperature of 70° C. Thus were obtained test specimens for use in tests For tensile strength and flexural strength. In Table 4 are given the results obtained in the strength tests. Potassium titanate whiskers were extracted from the test pieces to measure their lengths, however, no significant difference was observed between the whiskers of Example 4 and of Comparative Example 4.

TABLE 4

|  | Example 4 | Comp. Example 4 |
| --- | --- | --- |
| Tensile Strength (kgf/cm2) | 1030 | 820 |
| Flexural Strength (kgf/cm2) | 1980 | 1510 |
| Flexural modulus (kgf/cm2) | 106500 | 78500 |

EXAMPLE 5

7 parts of the potassium hexatitanate whiskers obtained in Example 1 was charged together with 93 parts of a polypropylene resin (trade name: UBE Polypro J709HK, a product of Ube Industries, Ltd.) into a twin-screw extruder AS-30 (manufactured by Nakatani Kikai Co., Ltd.), to obtain pellets thereof by melting and kneading at 220° C.

Comparative Example 5

Seven parts of the potassium hexatitanate whiskers obtained in Comparative Example 1 was charged together with 93 parts of a polypropylene resin (trade name: UBE Polypro J709HK, a product of Ube Industries, Ltd.) into a biaxial extruder AS-30 (manufactured by Nakatani Kikai Co., Ltd.), to obtain pellets thereof by melting and kneading at 220° C.

The pellets obtained in Example 5 and Comparative Example 5 were then injection molded using an injection molding machine Model SAV-30-30 (manufactured by Yumashiro Seiki Seisakusho) at a cylinder temperature of 220° C. and a mold face temperature of 60° C. Thus were obtained test specimens for use in tests for tensile strength and flexural strength. In Table 5 are given the results obtained in the strength tests. Potassium titanate whiskers were extracted from the test pieces to measure their lengths, however, no significant difference was observed between the whiskers of Example 5 and of Comparative Example 5.

TABLE 5

|  | Example 5 | Comp. Example 5 |
| --- | --- | --- |
| Tensile Strength (kgf/cm2) | 410 | 310 |
| Flexural Strength (kgf/cm2) | 470 | 390 |
| Flexural modulus (kgf/cm2) | 24000 | 17000 |

EXAMPLE 6

A slurry of 4700 g of a metatitanic acid containing 30% of $TiO_2$, 0.129% of $Nb_2O_5$, and 0.017% of $Al_2O_3$ was added 18 ml of an aqueous aluminum sulfate solution containing 50 g/l of aluminum as $Al_2O_3$, and the resulting mixture was stirred for 20 minutes. After adding thereto 930 g of potassium carbonate powder and mixing, the slurry was spray-dried while maintaining the temperature at the inlet to a range of from 270° to 280° C. and that at the outlet from 80° to 85° C. The powder thus obtained was charged into an alumina crucible, and was placed in an electric furnace for baking. The baking was conducted by heating the powder at a rate of 150° C./hour, maintaining at 950° C. for 1 hour, and cooling at a rate of 150° C./hour.

The resulting baked product was then dipped into 10 l of hot water maintained in a stainless steel vessel, and after 5 hours of immersion, the slurry was stirred at 600 rpm for 1 hour. The temperature of the slurry was then adjusted to 60° C., and 5N-hydrochloric acid was added therein dropwise to adjust the pH value to 9.5. As a further stirring increases the pH value due to the elution of potassium ions from between the layers of the potassium tetratitanate, hydrochloric acid was continually added dropwise every 30 minutes after the first addition thereof, so that the increment in pH value might not exceed 0.1. In this manner the slurry was adjusted the pH value to 9.5.

The whiskers thus obtained was filtered, and baked at 950° C. for 2 hours. The resulting product was dispersed into 10 l of hot water, and after adjusting the pH value of the dispersion to 4 by adding dropwise 1N-hydrochloric acid, whiskers were obtained by filtration, washing, and drying. Identification of the resulting fibers by X-ray diffraction revealed that the final products were single phase of potassium hexatitanate. SEM (Scanning Electron Microscope) observation revealed the whiskers to have an average length of 50 μm and an average diameter of 1.0 μm.

Chemical analysis of the potassium titanate whiskers thus obtained yielded 0.354% $Nb_2O_5$, 0.095% $Al_2O_3$, 0.005% $Fe_2O_3$, 0.010% MgO, 0.085% CaO, 0.012% ZnO, 0.009% $P_2O_5$, and 0.006% $SiO_2$ as impurities, and the molar ratio of $TiO_2/K_2O$ was found to be 6.0.

The value of $d_{712}$-spacing was found to be 1.6644 Å by powder X-ray diffraction using 99.9% pure high purity silicon powder as the internal standard.

The potassium titanate whiskers thus obtained was added into water to give a dispersion containing the potassium titanate whiskers at a concentration of 150 g/l, and after adding further therein 0.1% by weight of a dispersant (trade name: Nopcosant RFA, a product of San Nopco Co., Ltd.), stirring was conducted for 30 minutes using a homomixer to obtain a homogeneous dispersion. Then, polyvinyl alcohol (trade name: Kuraray Poval 205, a product from Kuraray Co., Ltd.) was added to the potassium titanate whiskers at an amount equivalent to 8.0% by weight. The slurry thus obtained was poured into a mold made of a vinyl chloride resin to obtain a preform by suction filtering. The preform was then replaced in a mold, and pressure was applied thereto to obtain a preform containing the whiskers at a volume fraction of 30%. Then the resulting preform was released from the mold, dried, and then heated to 950° C. to obtain a baked preform.

The thus obtained preform was pre-heated at ca. 800° C., and was then replaced into a mold which have been maintained at a temperature of 350° C. To the preform in the mold was poured a molten of A132 (U.S. standard) material at ca. 800° C. while applying thereto a pressure of 1000 kg/cm², which was followed by rapid cooling to obtain a solid composite material.

EXAMPLE 7

High quality potassium hexatitanate whiskers were synthesized under conditions similar to those of the process in Example 6, except for changing the baking temperature after partially removing potassium from between the layers of potassium tetratitanate whiskers from 950° C. to 850° C. The purity and the chemical composition of the resulting potassium titanate whiskers were the same as those obtained in Example 6.

A preform containing whiskers at a volume fraction of 30% was prepared in a similar procedure as that employed in Example 6. Thus, the preform having been preheated to ca. 800° C. was placed in a mold maintained at a temperature of 350° C., and a molten A132 (U.S. standard) material at ca. 800° C. was poured thereto under a pressure maintained at 1000 kg/cm², which was followed by rapid cooling to obtain a composite material.

Comparative Example 6

A slurry of 4700 g of a metatitanic acid containing 30% of $TiO_2$, 0.129% of $Nb_2O_5$, and 0.017% of $Al_2O_3$ was added 930 g of potassium carbonate powder and mixed. The resulting slurry was spray-dried while maintaining the temperature at the inlet to a range of from 270° to 280° C. and that at the outlet from 80° to 85° C. The powder thus obtained was charged into an alumina crucible, and was placed in an electric furnace for baking. The baking was conducted by heating the powder at a rate of 150° C./hour, maintaining at 1050° C. for 1 hour, and cooling at a rate of 150° C./hour.

The resulting baked product was then dipped into 10 l of hot water maintained in a stainless steel vessel, and after 5 hours of immersion, the slurry was stirred at 600 rpm. The temperature of the slurry was then adjusted to 60° C., and 5N-hydrochloric acid was added therein dropwise to adjust the pH value to 9.5. As a further stirring increases the pH value due to the elution of potassium ions from between the layers of the potassium tetratitanate, hydrochloric acid was continually added dropwise every 30 minutes after the first addition thereof, so that the increment in pH value might not exceed 0.1. In this manner the slurry was adjusted the pH value to 9.5.

The whiskers thus obtained was filtered, and baked at 950° C. for 2 hours. The resulting product was dispersed into 10 l of hot water, and after adjusting the pH value of the dispersion to 4 by adding dropwise 1N-hydrochloric acid, whiskers were obtained by filtration, washing, and drying. Identification of the resulting fibers by X-ray diffraction revealed that the final products were single phase of potassium hexatitanate. SEM (Scanning Electron Microscope) observation revealed the whiskers to have an average length of 50 μm and an average diameter of 1.0 μm.

Chemical analysis of the potassium titanate whiskers thus obtained yielded 0.354% $Nb_2O_5$, 0.042% $Al_2O_3$, 0.005% $Fe_2O_3$, 0.010% MgO, 0.085% CaO, 0.012% ZnO, 0.009% $P_2O_5$, and 0.006% $SiO_2$ as impurities, and the molar ratio of $TiO_2/K_2O$ was found to be 6.0.

The value of $d_{712}$-spacing was found to be 1.6658 Å by powder X-ray diffraction using 99.9% pure high purity silicon powder as the internal standard. The value 1.6658 Å is larger than that obtained for potassium titanate in Example 1, and it is believed this increase in d-spacing is caused by dissolving of $Al^{3+}$ in a crystal lattice of potassium titanate, i.e., because $Al^{3+}$ ion smaller than $Ti^{3+}$ in ion diameter and substituted for $Ti^{3+}$ in the crystal lattice of potassium titanate.

A preform containing whiskers at a volume fraction of 30% was prepared in a similar procedure as that employed in Example 6. Thus, the preform having been preheated to ca. 800° C. was replaced in a mold maintained at a temperature of 350° C., and a molten A132 (U.S. standard) material at ca. 800° C. was poured thereto under a pressure maintained at 1000 kg/cm², which was followed by rapid cooling to obtain a composite material.

EXAMPLE 8

Potassium hexatitanate whiskers having a tunnel structure were synthesized under conditions similar to those of the process in Example 6, except for using a titanium oxide in antase form (containing 0.157% $Nb_2O_5$ and 0.072% $Al_2O_3$) as the titanium source. SEM observation of the whiskers thus obtained revealed that they have an average length of 40 μm and an average diameter of 1.0 μm. Chemical analysis of the potassium titanate whiskers yielded 0.130% $Nb_2O_5$, 0.055% $Al_2O_3$, 0.008% $Fe_2O_3$, 0.009% MgO, 0.101% CaO, 0.010% ZnO, 0.010% $P_2O_5$, and 0.007% $SiO_2$ as impurities, and the molar ratio of $TiO_2/K_2O$ was found to be 6.0.

A preform for sintering containing whiskers at a volume fraction of 30% was prepared in a similar procedure as that employed in Example 6. Thus, the preform having been preheated to ca. 800° C. was replaced in a mold maintained at a temperature of 350° C., and a molten A132 (U.S. standard) material at ca. 800° C. was poured thereto under a pressure maintained at 1000 kg/cm², which was immediately followed by a rapid cooling to obtain a composite material.

Comparative Example 7

Potassium hexatitanate whiskers having a tunnel structure were synthesized under conditions similar to those of the process in Comparative Example 6, except for using titanium oxide in anatase form (containing 0.157% $Nb_2O_5$ and 0.032% $Al_2O_3$) as the titanium source. SEM observation of the whiskers thus obtained revealed that they have an average length of 40 μm and an average diameter of 1.0 μm. Chemical analysis of the potassium titanate whiskers yielded 0.131% $Nb_2O_5$, 0.026% $Al_2O_3$, 0.012% $Fe_2O_3$, 0.014% MgO, 0.094% CaO, 0.014% ZnO, 0.010% $P_2O_5$, and 0.013% $SiO_2$ as impurities, and the molar ratio of $TiO_2/K_2O$ was found to be 6.0.

A preform containing whiskers at a volume fraction of 30% was prepared in a similar procedure as that employed in Example 6. Thus, the preform having been preheated to ca. 800 ° C. was replaced in a mold maintained at a temperature of 350° C., and a molten A132 (U.S. standard) material at ca. 800 ° C. was poured thereto under a pressure maintained at 1000 kg/cm², which was followed immediately thereafter by a rapid cooling to obtain a composite material.

Reference Example 1

A preform was prepared under conditions similar to those used in Example 6, except for using TISMO N (potassium titanate whiskers manufactured by Otsuka Chemical Co., Ltd. ) as potassium titanate whiskers. Chemical analysis of this commercially available potassium titanate whiskers yielded 0.120% $Nb_2O_5$, 0.062% $Al_2O_3$, 0.010% $Fe_2O_3$, 0.027% MgO, 0.111% CaO, 0.001% ZnO, 0.089% $P_2O_5$, and 0.005% $SiO_2$ as impurities, and the molar ratio of $TiO_2/K_2O$ was found to be 6.3. Furthermore, this whisker was identified by X-ray diffraction analysis to be a two-phase mixture consisting of potassium hexatitanate whiskers and titanium dioxide in anatase form.

Then, the preform having been preheated to ca. 800° C. was replaced in a mold maintained at a temperature of 350° C., and a molten A132 (U.S. standard) material at ca. 800° C. was poured thereto under a pressure maintained at 1000 kg/cm², which process was followed immediately thereafter by rapid cooling to obtain a composite material.

Reference Example 2

A preform was prepared under conditions similar to those used in Example 6, except For using Tofica Y (potassium titanate whiskers manufactured by Nippon Whisker Co., Ltd.) as potassium titanate whiskers. Chemical analysis of this commercially available potassium titanate whiskers yielded 0.222% $Nb_2O_5$, 0.276% $Al_2O_3$, 1.487% $Fe_2O_3$, 0.008% NiO, 0.034% MnO, 0.073% MgO, 0.053% CaO, 0.011% ZnO, 0.131% $P_2O_5$, and 0.010% $SiO_2$ as impurities, and the molar ratio of $TiO_2/K_2O$ was found to be 6.2. Furthermore, this whisker was identified by X-ray diffraction analysis to be a two-phase mixture consisting of potassium hexatitanate whiskers and titanium dioxide in anatase form.

Then, the preform having been preheated to ca. 800° C. was replaced in a mold maintained at a temperature of 350° C., and a molten A132 (U.S. standard) material was poured thereto at ca. 800° C. under a pressure maintained at 1000 kg/cm², which process was followed immediately thereafter by rapid cooling to obtain a composite material.

The composite materials obtained in Examples 6, 7, and 8, and Comparative Examples 6 and 7, as well as in Reference Examples 1 and 2 were machined to obtain test pieces for a tensile test.

The tensile strength at room temperature of the test pieces before heat treatment and after T71 heat treatment (comprising steps of solution heat treatment at 525° C. for 16 hours, water-quenching, and artifial aging treatment at 188° C. for 5 hours). The test results are given in Table 6.

TABLE 6

| | Tensile Strength (MPa) | |
|---|---|---|
| | Before Heat Treatment | After Heat Treatment |
| Example 6 | 381 | 415 |
| Example 7 | 370 | 398 |
| Example 8 | 388 | 412 |
| Comp. Ex. 6 | 379 | 330 |
| Comp. Ex. 7 | 382 | 361 |
| Ref. Ex. 1 | 334 | 270 |
| Ref. Ex. 2 | 325 | 251 |

It can be seen from Table 6 that the strength of the composite materials reinforced with the potassium titanate whiskers, according to the present invention are all improved in strength after heat treatment, whereas that of the Comparative Examples 6 and 7 and of the Reference Examples 1 and 2 are considerably reduced in strength after the heat treatment. Particularly in the case of Reference Examples 1 and 2, where the commercially available potassium titanate whiskers containing impurities aluminum and niobium at a such amount that the $Al_2O_3/Nb_2O_5$ molar ratio is 0.6 or higher, the strength decreased significantly. This is believed due to the fact that both potassium titanate whiskers are not single phase of potassium hexatitanate. Furthermore, in the potassium titanate whiskers of the Reference Example 2 in particular, the presence of a large amount of impurities is found as another reason for the poor strength after the heat treatment.

EXAMPLE 9

A preform containing whiskers at a volume fraction of 16% was prepared in the same procedure as that employed in Example 6, using potassium hexatitanate whiskers obtained in Example 6.

Thus, the preform having been preheated to ca. 800° C. was replaced in a mold maintained at a temperature of 350° C., and a molten AC8A (JIS standard) material at ca. 800° C. was poured thereto under a pressure maintained at 1000 kg/cm$^2$, which was followed immediately thereafter by a rapid cooling to obtain a composite material.

Comparative Example 8

A preform containing whiskers at a volume fraction of 16% was prepared in the same procedure as that employed in Example 6, using potassium titanate whiskers obtained in Comparative Example 6.

Thus, the preform having been heated to ca. 800° C. was placed in a mold maintained at a temperature of 350° C., and a melt of JIS standard AC 8A material at ca. 800° C. was poured thereto under a pressure maintained at 1000 kg/cm$^2$, which was followed immediately thereafter by a rapid cooling to obtain a composite material.

The composite materials obtained in Example 9 and Comparative Example 8 were machined to obtain test pieces as shown in FIG. 1 for a tensile test.

The tensile strength at room temperature of the test pieces before heat treatment and after T6 heat treatment (comprising steps of solution heat treatment at 510° C. for 4 hours, water-quenching, and artifical aging treatment at 170° C. for 10 hours). The test results are given in Table 7.

TABLE 7

| | Tensile Strength (MPa) | |
|---|---|---|
| | Before Heat Treatment | After Heat Treatment |
| Example 9 | 372 | 394 |
| Comp. Ex. 8 | 374 | 350 |

EXAMPLE 10

A preform containing whiskers at a volume fraction of 25% was prepared in the same procedure as that employed in Example 6, using the potassium titanate whiskers obtained in Example 6.

Thus, the preform having been preheated to ca. 800° C. was replaced in a mold maintained at a temperature of 350° C., and a molten AC4C (JIS standard) material at ca. 770° C. was poured thereto, which was followed immediately thereafter by a rapid cooling under a pressure maintained at 1000 kg/cm$^2$ to obtain a composite material.

Comparative Example 9

A preform containing whiskers at a volume fraction of 25% was prepared in the same procedure as that employed in Example 6, using the potassium titanate whiskers obtained in Comparative Example 6.

Thus, the preform having been preheated to ca. 800° C. was replaced in a mold maintained at a temperature of 350° C., and a molten Ac4C (JIS standard) material at ca. 770° C. was poured thereto, which was followed immediately thereafter by a rapid cooling under a pressure maintained at 1000 kg/cm$^2$ to obtain a composite material.

The composite materials obtained in Example 10 and Comparative Example 9 were machined to obtain test pieces as shown in FIG. 1 for the tensile test.

The tensile strength at room temperature of the test pieces before heat treatment and after T61 heat treatment (comprising steps of solution heat treatment at 525° C. for 8 hours, water-quenching, and artifical aging treatment at 170° C. for 6 hours). The test results are given in Table 8.

TABLE 8

| | Tensile Strength (MPa) | |
|---|---|---|
| | Before Heat Treatment | After Heat Treatment |
| Example 10 | 362 | 381 |
| Comp. Ex. 9 | 354 | 327 |

While the invention has been described in detail and with reference to specific embodiments thereof, it will be apparent to one skilled in the art that various changes and modifications can be made therein without departing from the spirit and scope of the invention.

What is claimed is:

1. A potassium hexatitanate whisker having a tunnel structure containing aluminum and niobium impurities in such amounts that the Al$_2$O$_3$/Nb$_2$O$_5$ molar ratio is at least 0.6 and containing 1% or less by weight in total of impurities as oxides other than aluminum and niobium.

2. An alloy-base composite material comprising a light alloy matrix and potassium hexatitanate whiskers having a tunnel structure, said whiskers containing aluminum and niobium impurities in such amounts that the Al$_2$O$_3$/Nb$_2$O$_5$ molar ratio is at least 0.6 and containing 1% or less by weight in total of the whiskers impurities as oxides other than aluminum and niobium.

* * * * *